(12) United States Patent
Chung et al.

(10) Patent No.: US 9,612,867 B2
(45) Date of Patent: Apr. 4, 2017

(54) APPARATUS AND METHOD FOR DATA PARTITION AND ALLOCATION IN HETEROGENEOUS MULTI-PROCESSOR ENVIRONMENT

(75) Inventors: Hee-Jin Chung, Seoul (KR); Hyun-Ki Baik, Seongnam-si (KR); Jae-Won Kim, Hwaseong-si (KR); Gyong-Jin Joung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 812 days.

(21) Appl. No.: 13/197,664

(22) Filed: Aug. 3, 2011

(65) Prior Publication Data
US 2012/0131588 A1    May 24, 2012

(30) Foreign Application Priority Data

Nov. 23, 2010  (KR) .................... 10-2010-0117050

(51) Int. Cl.
*G06F 9/46* (2006.01)
*G06F 9/48* (2006.01)

(52) U.S. Cl.
CPC ...... *G06F 9/4881* (2013.01); *G06F 2209/483* (2013.01)

(58) Field of Classification Search
None
See application file for complete search history.

(56) References Cited

U.S. PATENT DOCUMENTS

| | | | | |
|---|---|---|---|---|
| 4,722,072 A | * | 1/1988 | Price | 710/244 |
| 6,779,182 B1 | * | 8/2004 | Zolnowsky | G06F 9/4843 |
| | | | | 709/203 |
| 7,369,256 B2 | * | 5/2008 | Kizaki | 358/1.13 |
| 7,380,039 B2 | * | 5/2008 | Miloushev et al. | 710/244 |
| 8,108,844 B2 | * | 1/2012 | Crutchfield et al. | 717/149 |
| 8,146,063 B2 | | 3/2012 | Lindwer et al. | |

(Continued)

FOREIGN PATENT DOCUMENTS

| | | |
|---|---|---|
| JP | 6-75786 B2 | 9/1994 |
| JP | 2006-520034 A | 8/2006 |

(Continued)

OTHER PUBLICATIONS

Korean Office Action issued on Jun. 8, 2016 in counterpart Korean Patent Application No. 10-2010-0117050 (9 pages in Korean with English translation).

(Continued)

*Primary Examiner* — Gregory A Kessler
(74) *Attorney, Agent, or Firm* — NSIP Law

(57) ABSTRACT

An apparatus for data processing in a heterogeneous multi-processor environment are provided. The apparatus including an analysis unit configured to analyze 1) operations to be run in connection with data processing and 2) types and a number of processors available for the data processing, a partition unit configured to dynamically partition data into a plurality of data regions having different sizes based on the analyzed operations and operation-specific processor priority information, which is stored in advance of running the operations, and a scheduling unit configured to perform scheduling by allocating operations to be run in the data regions between the available processors.

19 Claims, 11 Drawing Sheets

(56) References Cited

U.S. PATENT DOCUMENTS

2007/0283337 A1    12/2007   Kasahara et al.
2008/0109814 A1    5/2008   Park
2009/0150898 A1    6/2009   Sohn et al.
2009/0154572 A1    6/2009   Baik et al.

FOREIGN PATENT DOCUMENTS

KR   10-2007-0116712    12/2007
KR   10-2008-0041047    5/2008
KR   10-2009-0061177    6/2009
KR   10-2009-0065398    6/2009

OTHER PUBLICATIONS

Korean Office Action issued on Nov. 29, 2016, in counterpart Korean Application No. 10-2010-0117050 (3 pages in English, 4 pages in Korean).
Korean Notice of Allowance issued on Jan. 19, 2017, in counterpart Korean Application No. 10-2010-0117050 ((2 pages in English, 2 pages in Korean).

\* cited by examiner

FIG. 5

| PRIORITY / OPERATION | 1 | 2 | 3 |
|---|---|---|---|
| OPERATION 1 | MAIN PROCESSOR | | |
| OPERATION 2 | ACCELERATOR 1 | MAIN PROCESSOR | |
| OPERATION 3 | MAIN PROCESSOR | | |
| OPERATION 4 | ACCELERATOR 2 | ACCELERATOR 1 | MAIN PROCESSOR |
| OPERATION 5 | ACCELERATOR 1 | MAIN PROCESSOR | |
| OPERATION 6 | MAIN PROCESSOR | | |

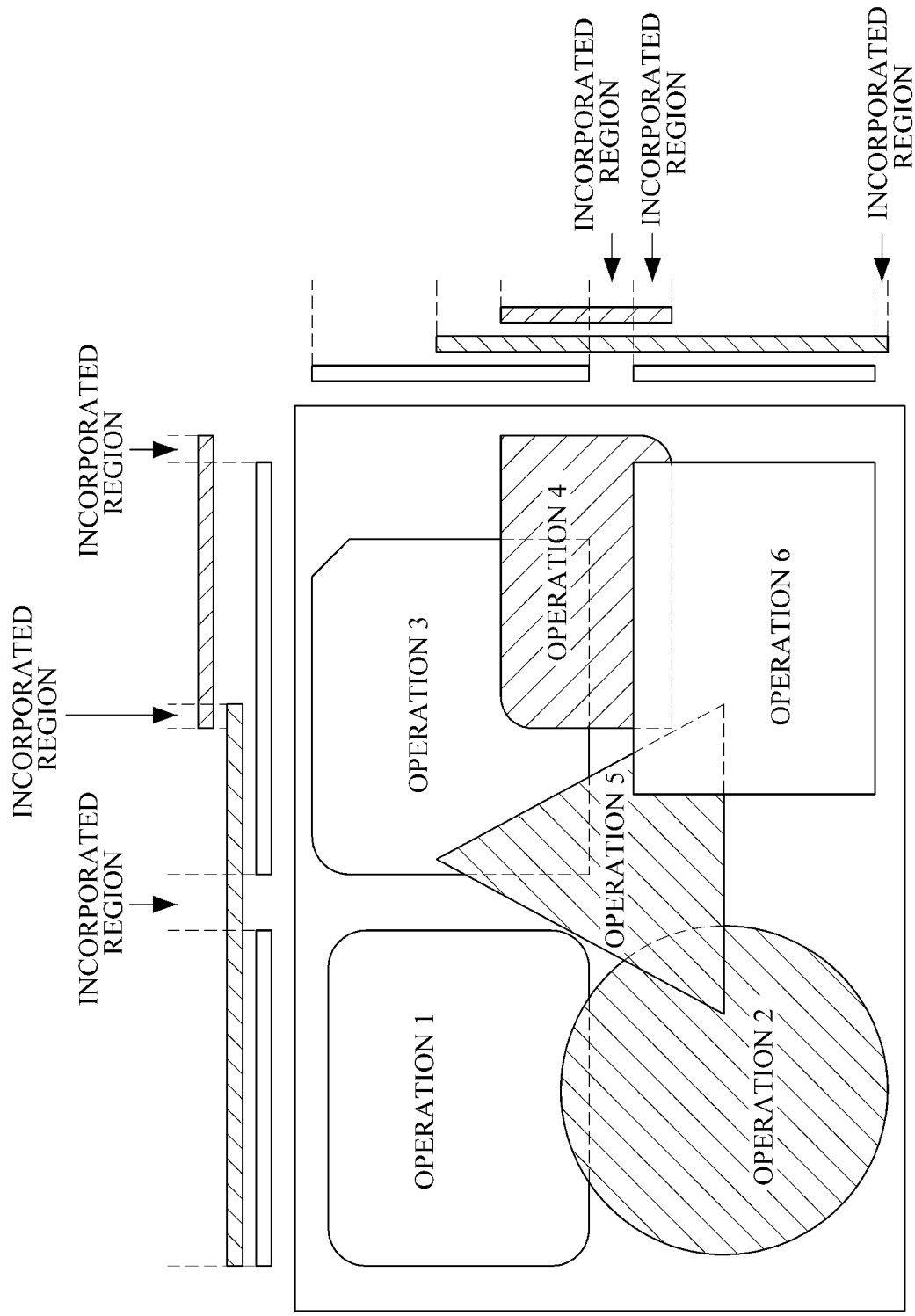

FIG. 7

| DATA REGION / PROCESSOR | DATA REGION 1 | DATA REGION 2 | DATA REGION 3 | DATA REGION 4 | DATA REGION 5 | DATA REGION 6 | DATA REGION 7 | DATA REGION 8 |
|---|---|---|---|---|---|---|---|---|
| MAIN PROCESSOR | OPERATION 1 | OPERATION 1 | OPERATION 1 | OPERATION 1 | | | | |
| ACCELERATOR 1 | | | | OPERATION 2 | OPERATION 2 | OPERATION 2 | OPERATION 2 | OPERATION 2 |
| MAIN PROCESSOR | OPERATION 3 | OPERATION 3 | OPERATION 3 | OPERATION 3 | | | | |
| ACCELERATOR 2 | | | | OPERATION 4 | OPERATION 4 | | | |
| ACCELERATOR 1 | | | OPERATION 5 | OPERATION 5 | OPERATION 5 | OPERATION 5 | | |
| MAIN PROCESSOR | | | | | OPERATION 6 | OPERATION 6 | OPERATION 6 | OPERATION 6 |

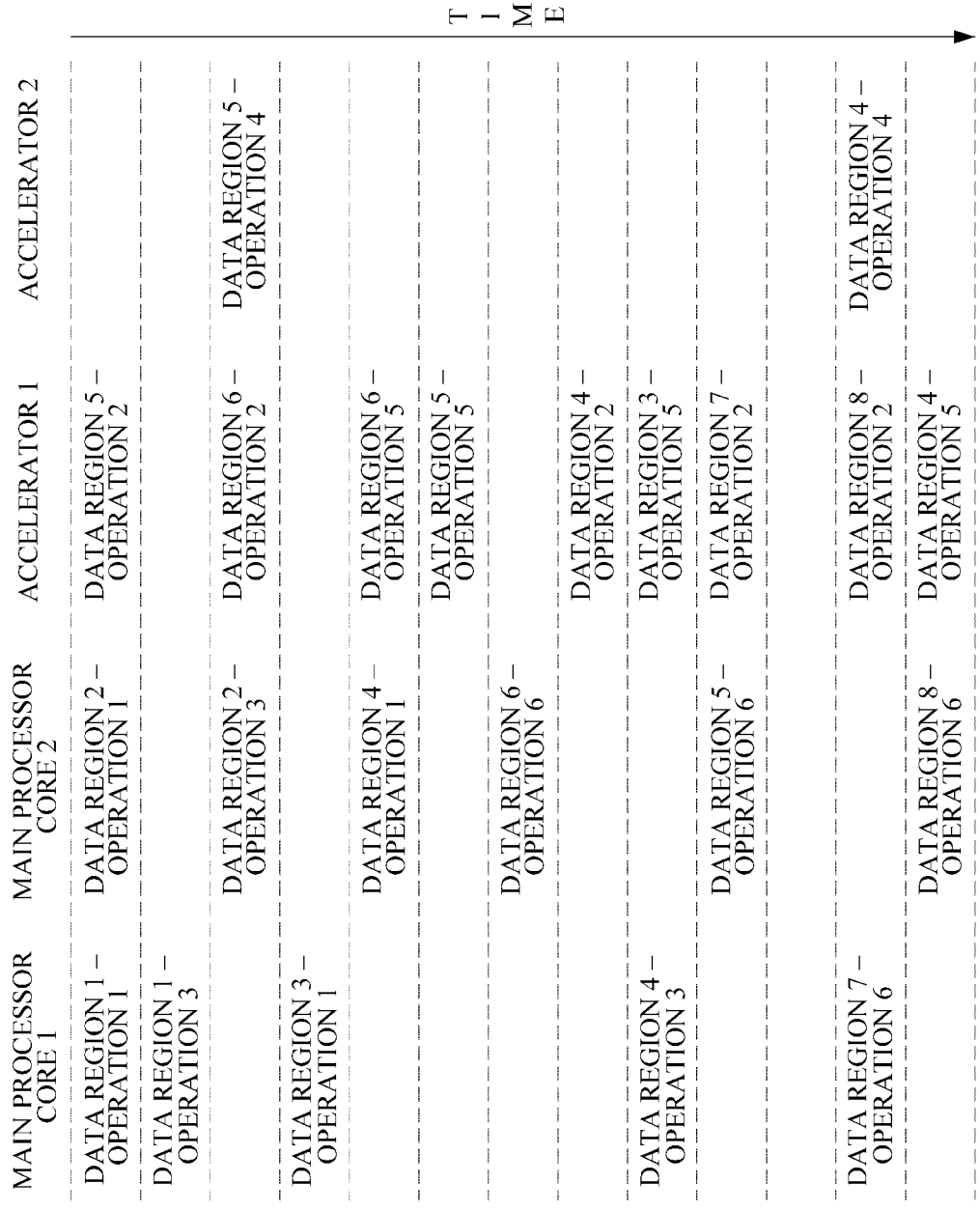

APPARATUS AND METHOD FOR DATA PARTITION AND ALLOCATION IN HETEROGENEOUS MULTI-PROCESSOR ENVIRONMENT

CROSS-REFERENCE TO RELATED APPLICATION(S)

This application claims the benefit under 35 U.S.C. §119(a) of Korean Patent Application No. 10-2010-0117050, filed on Nov. 23, 2010, in the Korean Intellectual Property Office, the entire disclosure of which is incorporated herein by reference for all purposes.

BACKGROUND

1. Field

The following description relates to an apparatus and method for processing data in a heterogeneous multi-processor environment.

2. Description of the Related Art

Heterogeneous multi-processor systems may be systems equipped with heterogeneous processors, for example, a main processor and accelerators. Since the accelerators can run only certain tasks at high speed, the use of the accelerators for all operations may deteriorate the overall performance of the entire heterogeneous multi-processor system. Thus, certain tasks may be run by the accelerators, and other tasks may be run by the main processor.

One of the simplest ways to utilize accelerators in a heterogeneous multi-processor environment is to allocate tasks between processor cores. However, if there is a dependency between the tasks, a main processor and accelerators may not be able to run the tasks at the same time in parallel, and the main processor or the accelerators may often be placed in a standby mode.

There may be certain tasks that are determined to be processed by certain processor cores. In this case, even though there are other processing cores available and the other processing cores may have better processing capabilities than the certain processor cores, the other available processing cores may not be used during run time and may often be placed in a standby mode instead.

SUMMARY

The following description relates to a technique of optimizing data processing in a heterogeneous multi-processor environment, which may solve the problem that, in a heterogeneous multi-processor environment, some processors become idle due to an operation dependency while other processors run operations.

In one general aspect, an apparatus for optimizing data processing in a heterogeneous multi-processor environment is provided. The apparatus includes an analysis unit configured to analyze 1) operations to be run in connection with data processing and 2) types of processors and a number of processors available for the data processing, a partition unit configured to dynamically partition data into a plurality of data regions having different sizes based on the analyzed operations and operation-specific processor priority information, the operation-specific processor priority information being stored in advance of running the operations, and a scheduling unit configured to perform scheduling by allocating operations to be run in the data regions between the available processors.

The operation-specific processor priority information may include priority levels of processors to run each operation at high speed.

The scheduling unit may be further configured to manage the operations to be run in the data regions by placing the operations to be run in the data regions in a queue.

The scheduling unit may be further configured to place first in the queue, operations to be run in data regions having an operation dependency therebetween, regardless of a sequence between the data regions.

The scheduling unit may be further configured to place first in the queue operations to be run in data regions having a high operation dependency therebetween.

The partition unit may be further configured to preliminarily partition the data into a plurality of preliminary data regions and incorporate preliminary data regions, whose size is less than a predetermined size, with their neighboring preliminary data regions.

The partition unit may be further configured to determine a direction in which to partition the data in a case in which the data is two-dimensional or higher-dimensional.

The partition unit may be further configured to determine, as the direction in which to partition the data, a direction that produces a smallest quotient when dividing a total number of operations to be run by a number of data regions.

The partition unit may be further configured to additionally partition each data region, whose size is greater than a predetermined size, into smaller data regions.

The number of processors may be more than one.

In another general aspect, a method of optimizing data processing in a heterogeneous multi-processor environment is provided. The method includes analyzing 1) operations to be run in connection with data processing and 2) types of processors and a number of processors available for the data processing, dynamically partitioning data into a plurality of data regions having different sizes based on the analyzed operations and operation-specific processor priority information, the operation-specific processor priority information being stored in advance of running the operations, and performing scheduling by allocating operations to be run in the data regions between the available processors.

The operation-specific processor priority information may include priority levels of processors to run each operation at high speed.

The performing scheduling may include managing the operations to be run in the data regions by placing the operations to be run in the data regions in a queue.

The performing scheduling may further include placing first in the queue operations to be run in data regions having an operation dependency therebetween, regardless of a sequence between the data regions.

The performing scheduling may further include placing first in the queue operations to be run in data regions having a high operation dependency therebetween.

The dynamically partitioning the data may include preliminarily partitioning the data into a plurality of preliminary data regions and incorporating preliminary data regions, whose size is less than a predetermined size, with their neighboring preliminary data regions.

The dynamically partitioning the data may further include determining a direction in which to partition the data in a case in which the data is two-dimensional or higher-dimensional.

The dynamically partitioning the data may further include determining, as the direction in which to partition the data, a direction that produces a smallest quotient when dividing a total number of operations to be run by a number of data regions.

The dynamically partitioning the data may further include additionally partitioning each data region, whose size is greater than a predetermined size, into smaller data regions.

The number of processors may be more than one.

Other features and aspects may be apparent from the following detailed description, the drawings, and the claims.

BRIEF DESCRIPTION OF THE DRAWINGS

FIG. 5 is a diagram illustrating an example of operation-specific processor priority information.

FIGS. 6A through 6C are diagrams illustrating an example of how to dynamically partition data.

FIG. 7 is a diagram illustrating an example of the classification of operations to be run in each data region by a processor.

FIG. 8 is a diagram illustrating an example of the scheduling for operations for each processor.

Figure 1:
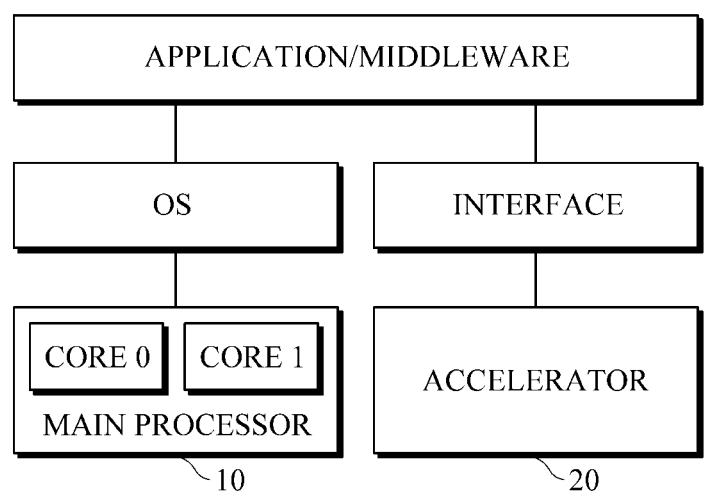
FIG. 1 is a diagram illustrating an example of a heterogeneous multi-processor environment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of a heterogeneous multi-processor environment. Referring to FIG. 1, a computing apparatus for use in a heterogeneous multi-processor environment may include a main processor 10 and at least one accelerator 20, which is a different type of processor from the main processor 10. The accelerator 20 may run only certain operations at high speed. Thus, the certain operations may be configured to be run by the accelerator 20, and other operations may be configured to be run by the main processor 10.

In a heterogeneous multi-processor environment, while some processors run operations, other processors may be placed in a standby mode due to dependencies between operations. In this case, an apparatus for optimizing data processing in a heterogeneous multi-processor environment may partition data into a plurality of data regions having different sizes based on the processing capabilities of heterogeneous processors, and the apparatus may allow some of the heterogeneous processors available to handle the data regions, thereby 1) minimizing any dependency between operations and 2) improving the data processing capabilities of the heterogeneous processors. The apparatus will hereinafter be described in detail with reference to FIG. 2.

Figure 2:
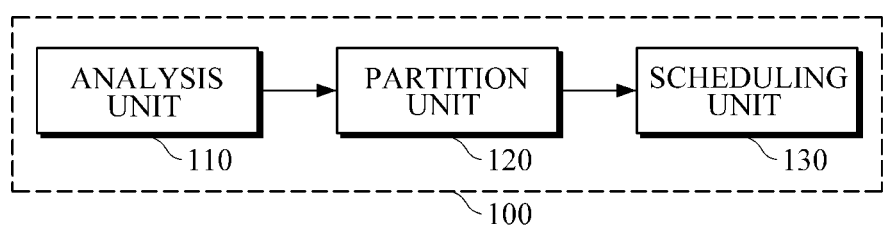
FIG. 2 is a diagram illustrating an example of an apparatus for optimizing data processing in a heterogeneous multi-processor environment.

FIG. 2 illustrates an example of an apparatus for optimizing data processing in a heterogeneous multi-processor environment. Referring to FIG. 2, an apparatus 100 includes an analysis unit 110, a partition unit 120, and a scheduling unit 130.

The analysis unit 110 analyzes 1) operations to be run in connection with data processing and 2) types of processors and a number of processors available for the data processing.

For example, the analysis unit 110 may acquire the operations to be run in connection with the data processing by putting on hold operations called over a predetermined period of time and monitoring the called operations for the predetermined period of time, instead of instantly running the called operations.

The analysis unit 110 may acquire the types of processors and the number of processors available from device registration information and device resource utilization information of an operating system (OS).

The partition unit 120 partitions data into a plurality of data regions having different sizes based on the operations acquired by the analysis unit 110 and operation-specific processor priority information, which is stored in advance of running the operations. The operation-specific processor priority information may include the priority levels of processors to run each operation at high speed.

Figure 3:
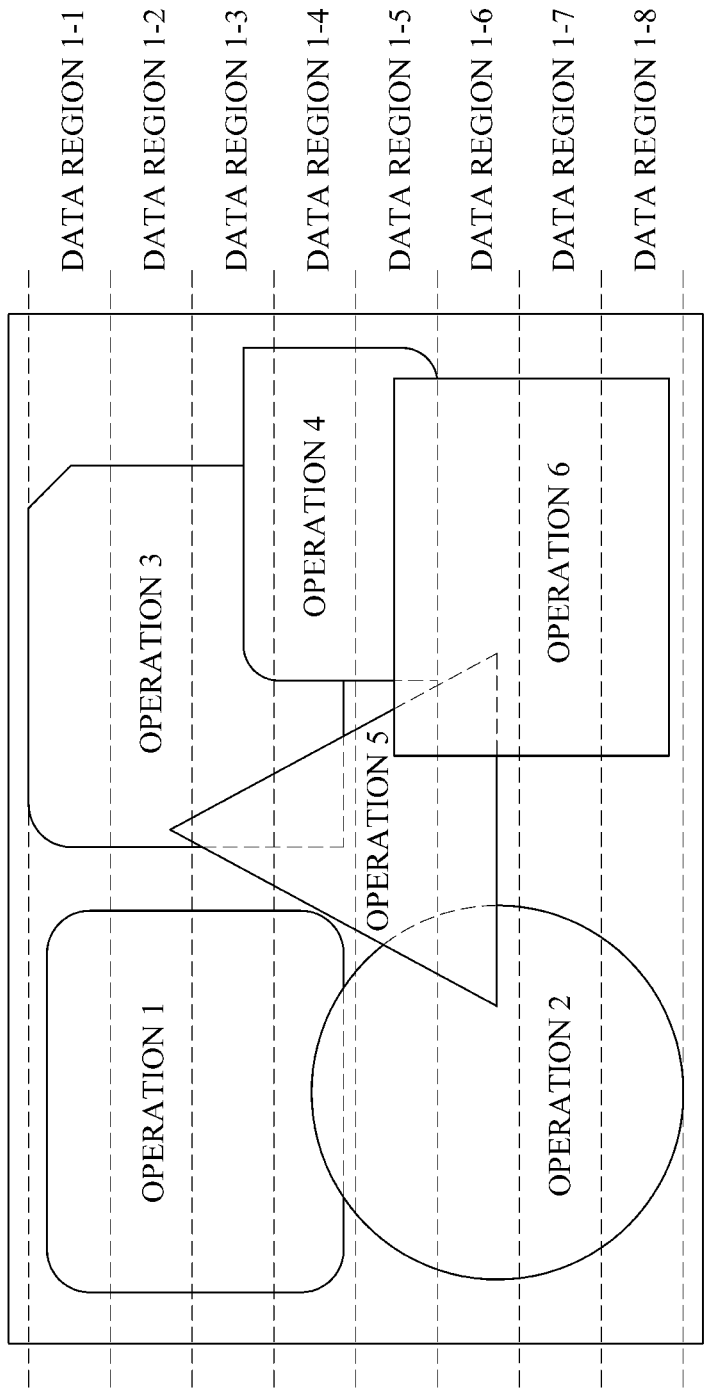
FIG. 3 is a diagram illustrating an example of the partitioning of data into a plurality of data regions having the same size.

It will hereinafter be described how to partition data including six operations, which output their respective screen interfaces on a screen, into a plurality of data regions with reference to FIGS. 3 and 4. FIG. 3 illustrates an example of the partitioning of data into a plurality of data regions having a same size, and FIG. 4 illustrates an example of the partitioning of data into a plurality of data regions having different sizes.

Referring to FIG. 3, data may be partitioned into a plurality of data regions having the same size, i.e., data regions 1-1 through 1-8. Since data region 1-2 includes a tiny part of operation 5, and data region 1-3 includes a tiny part of operation 4, data regions 1-1 through 1-8 have an operation dependency therebetween.

Figure 4:
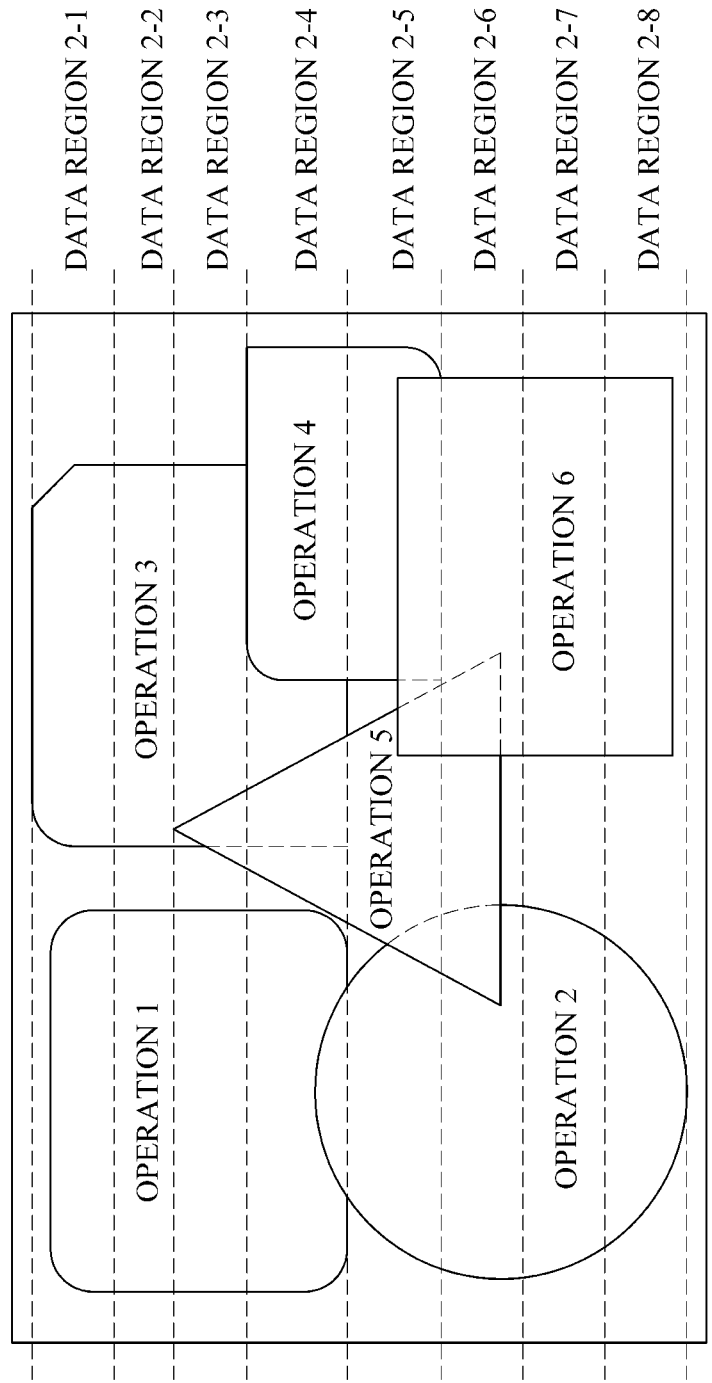
FIG. 4 is a diagram illustrating an example of the partitioning of data into a plurality of data regions having different sizes.

Referring to FIG. 4, data may be dynamically partitioned into a plurality of data regions having different sizes, i.e., data regions 2-1 through 2-8. Operation 5 is not included in data region 2-2, whereas operation 5 is included in data region 1-2 illustrated in FIG. 3. In addition, operation 4 is not included in data region 2-3, whereas operation 4 is included in data region 1-3 illustrated in FIG. 3. Thus, the operation dependency between data regions 2-1 through 2-8 is lower than the operation dependency between data regions 1-1 through 1-8.

The partition unit 120 dynamically partitions data into a plurality of data regions having different sizes using the operations acquired by the analysis unit 110, thereby resolving an operation dependency between the data regions. The partition unit 120 uses the operation-specific processor priority information to take into consideration the characteristics of heterogeneous processors having different processing capabilities in a heterogeneous multi-processor environment.

FIG. 5 illustrates an example of operation-specific processor priority information. Referring to FIG. 5, a main processor is a first-priority processor for operation 1, and accelerator 1 and the main processor are first- and second-priority processors, respectively, for operation 2.

The main processor is a first-priority processor for operation 3. Accelerator 2, accelerator 1, and the main processor are first-, second-, and third-priority processors, respectively, for operation 4. The accelerator 1 and the main processor are first- and second-priority processors, respectively, for operation 5. The main processor is a first-priority processor for operation 6.

Figure 6B:
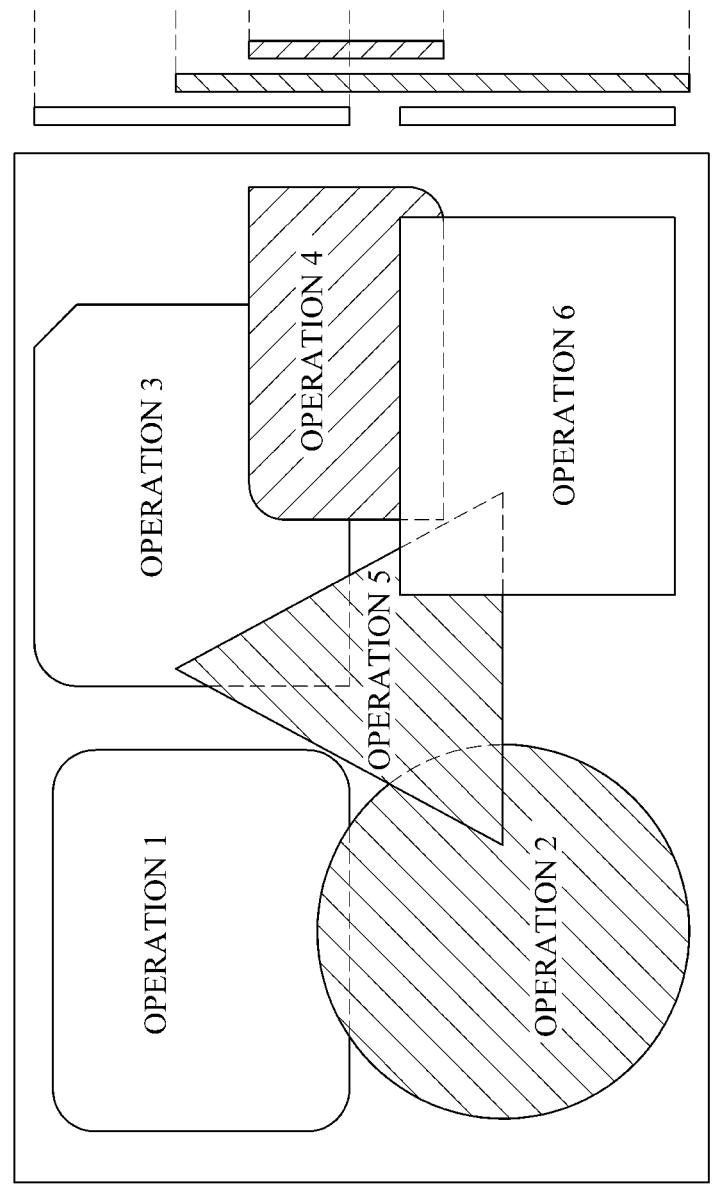
Figure 6C:
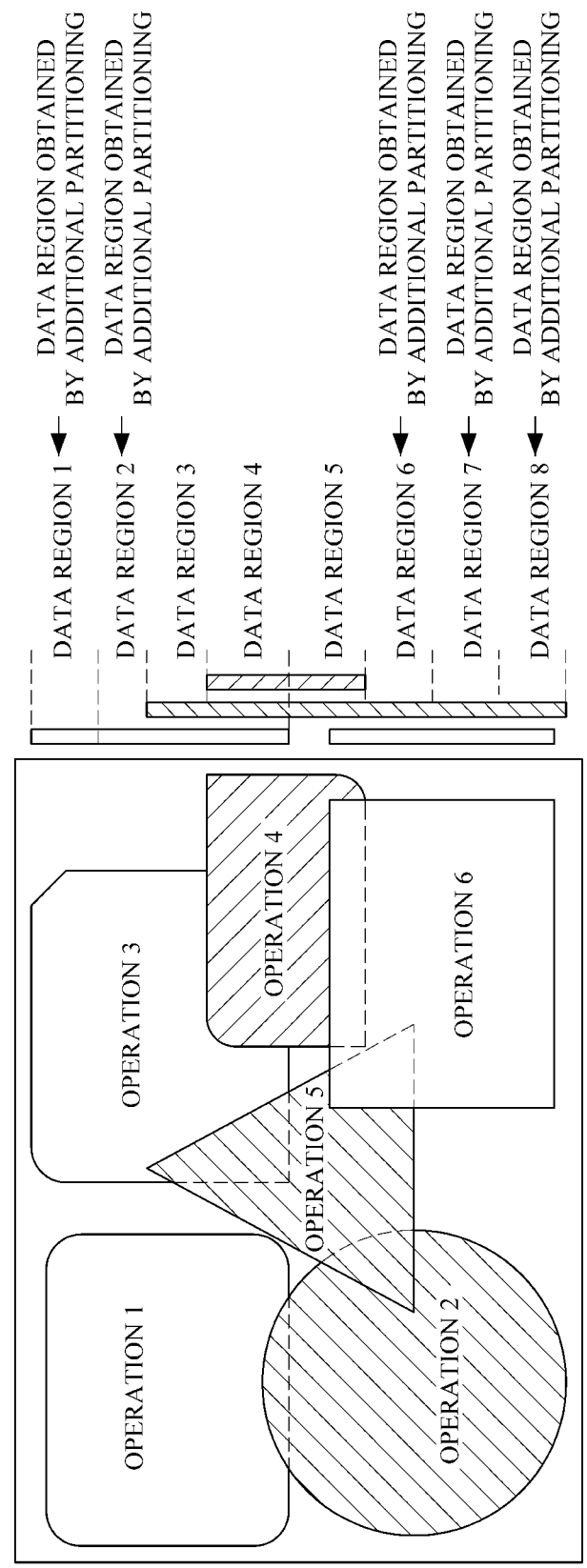

FIGS. 6A through 6C illustrate an example of how to dynamically partition data, for example, two-dimensional (2D) data. Referring to FIG. 6A, the partition unit 120 partitions 2D data preliminarily in x-axis and y-axis directions into a plurality of preliminary data regions in consideration of operation-specific processor priority information, and particularly, types of processors suitable for each operation and a number of processors suitable for each operation.

The partition unit 120 incorporates preliminary data regions, whose size is less than a predetermined size, with their neighboring preliminary data regions in order to reduce the number of preliminary data regions and thus to reduce the processing load.

For two-dimensional or higher-dimensional data, the partition unit 120 determines a direction in which to partition the data. For example, the partition unit 120 may be configured to determine, as the direction in which to partition the data, a direction that produces a smallest quotient when dividing a total number of operations to be run by the number of data regions.

Referring to FIGS. 6A and 6B, since the y-axis direction produces a smaller quotient than the x-axis direction, the partition unit 120 may determine the y-axis direction as the direction in which to partition the data.

Referring to FIG. 6C, the partition unit 120 additionally partitions each preliminary data region, whose size is greater than a predetermined size, into smaller data regions because the larger the preliminary data regions become, the longer it takes to process the preliminary data regions, and the lower the efficiency of processing the preliminary data regions.

As a result of dynamically partitioning the data, as described above with reference to FIGS. 6A through 6C, data regions 1 through 8 are obtained, as shown in FIG. 7. FIG. 7 illustrates a table showing operations to be run in each of data regions 1 through 8 and processors to run each of the operations.

Referring to FIG. 7, operations 1 and 3 are included in data regions 1 and 2, operations 1, 3, and 5 are included in data region 3, operations 1 through 5 are included in data region 4, operations 2, 4, 5 and 6 are included in data region 5, operations 2, 5, and 6 are included in data region 6, and operations 2 and 6 are included in data regions 7 and 8.

The scheduling unit 130 performs scheduling by allocating operations to be run in data regions obtained by the partition unit 120 between processors determined to be available based on results of analysis performed by the analysis unit 110. For example, the scheduling unit 130 may be configured to place the operations to be run in the data regions in a queue and thus to manage the operations to be run in the data regions.

The placing of the operations to be run in the data regions in the queue regardless of the sequence between the data regions may be one of the simplest ways of scheduling, but may not resolve an operation dependency between the data regions. Thus, the scheduling unit 130 may be configured to place operations to be run in data regions having an operation dependency therebetween first in the queue, regardless of the sequence between the data regions, and thus to reduce the operation dependency. The scheduling unit 130 may also be configured to place operations to be run in data regions having a high operation dependency therebetween in the queue ahead of operations to be run in data regions having a low operation dependency therebetween.

FIG. 8 illustrates an example of how operations are scheduled between processors by the scheduling unit 130. Referring to FIG. 8, a horizontal axis may represent various processors in a heterogeneous multi-processor environment, i.e., main processor cores 1 and 2 and accelerators 1 and 2, and a vertical axis may represent operations scheduled to be processed over the course of time by each of the various processors.

Each of main processor cores 1 and 2 and accelerators 1 and 2 may run operations placed in a queue by removing the operations from the queue. Dependency resolving may be performed on the operations in order from the front of the queue to the rear of the queue, and the main processor cores 1 and 2 and the accelerators 1 and 2 may search for and run first-priority operations, which may be operations designating the main processor cores 1 and 2 and the accelerators 1 and 2 as first-priority processors.

If none of the first-priority operations are dependency-resolved, the main processor cores 1 and 2 and the accelerators 1 and 2 may search any dependency-resolved operations from second-priority operations, which may be operations designating the main processor cores 1 and 2 and the accelerators 1 and 2 as second-priority processors, and run the dependency-resolved second-priority operations, or may wait a predetermined amount of time and search again for first-priority operations. The main processor cores 1 and 2 and the accelerators 1 and 2 may determine whether to run second-priority operations or to stand by for the predetermined amount of time based on 1) their current state information, 2) the number of first-priority operations yet to be run, and 3) the number of dependency-resolved first-priority operations.

In this manner, an apparatus for optimizing data processing in a heterogeneous multi-processor environment may improve data processing performance by partitioning data into a plurality of data regions having different sizes in consideration of the characteristics of heterogeneous processors having different processing capabilities in a heterogeneous multi-processor environment and processing operations to be run in the data regions so as to minimize any operation dependency between the data regions.

A data processing optimization operation performed by an apparatus for optimizing data processing in a heterogeneous multi-processor environment will hereinafter be described in detail with reference to FIG. 9.

Figure 9:
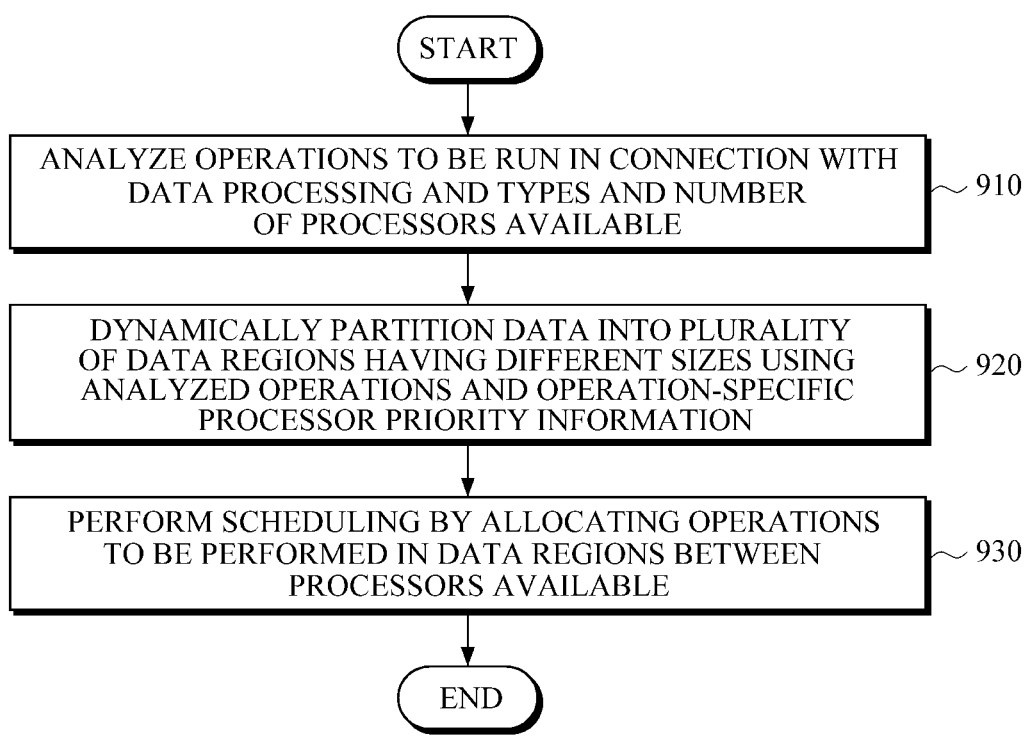
FIG. 9 is a flowchart illustrating an example of a method of optimizing data processing in a heterogeneous multi-processor environment.

FIG. 9 illustrates an example of a method of optimizing data processing in a heterogeneous multi-processor environment. Referring to FIG. 9, an apparatus for optimizing data processing in a heterogeneous multi-processor environment may analyze 1) operations to be run in connection with data processing and 2) types of processors and a number of processors available for the data processing (910).

For example, the apparatus may acquire the operations to be run in connection with data processing by putting on hold operations called over a predetermined period of time and monitoring called operations, instead of instantly running the called operations.

The apparatus may also acquire the types of processors and the number of processors available from device registration information and device resource utilization information of an operating system (OS).

The apparatus dynamically partitions data into a plurality of data regions having different sizes based on the operations analyzed in operation 910 and operation-specific processor priority information, which is stored in advance (920). For example, the operation-specific processor priority information may include priority levels of processors to run each operation at high speed.

In operation 920, the apparatus may preliminary partition the data into a plurality of preliminary data regions and incorporate preliminary data regions, whose size is less than a predetermined size, with their neighboring preliminary data regions.

If the data is two-dimensional or higher-dimensional, the apparatus may be configured to determine a direction in which to partition the data. For example, the apparatus may be configured to determine, as the direction in which to partition the data, a direction that produces a smallest quotient when dividing a total number of operations to be run by the number of data regions.

In operation 920, the apparatus may be configured to additionally partition each preliminary data region, whose size is greater than a predetermined size, into smaller data regions. The dynamic partitioning of data into a plurality of data regions has already been described above, and thus, a detailed description thereof will be omitted.

The apparatus performs scheduling by allocating operations to be run in the data regions obtained in operation 920 between the available processors analyzed in operation 910 (930).

For example, the apparatus may be configured to place the operations to be run in the data regions obtained in operation 920 in a queue and thus to manage the operations to be run in the data regions obtained in operation 920. The apparatus may also be configured to place operations to be run in data regions having an operation dependency therebetween first in the queue, regardless of the sequence between the data regions, and thus to reduce the operation dependency. The apparatus may also be configured to place operations to be run in data regions having a high operation dependency therebetween in the queue ahead of operations to be run in data regions having a low operation dependency therebetween.

In a heterogeneous multi-processor environment, various processors such as main processor cores and accelerators may run operations placed in a queue by removing the operations from the queue. Dependency resolving may be run on the operations in order from the front of the queue to the rear of the queue, and the various processors may search for and run first-priority operations, which are operations designating the various processors as first-priority processors.

In a case in which none of the first-priority operations are dependency-resolved, the various processors may search any dependency-resolved operations from second-priority operations, which are operations designating the various processors as second-priority processors, and run the dependency-resolved second-priority operations, or may wait a predetermined amount of time and search again for first-priority operations. The various processors may determine whether to run second-priority operations or to stand by for the predetermined amount of time based on 1) their current state information, 2) the number of first-priority operations yet to be run, and 3) the number of dependency-resolved first-priority operations.

In this manner, the apparatus can improve data processing performance by partitioning data into a plurality of data regions having different sizes in consideration of the characteristics of heterogeneous processors having different processing capabilities in a heterogeneous multi-processor environment and processing operations to be run in the data regions so as to minimize any operation dependency between the data regions.

The processes, functions, methods and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for optimizing data processing in a heterogeneous multi-processor environment, the apparatus comprising:
    an optimizing processor comprising
        an analyzer configured to analyze
            operations to be run in connection with data processing, by putting on hold operations called over a predetermined period of time, and monitoring the called operations for the predetermined period of time,
            a processor type of each processor available for the data processing among processors in the heterogeneous multi-processor environment, and
            a quantity of the processors available for the data processing;
        a partitioner configured to dynamically partition data into data regions having different sizes, based on the analyzed operations and operation-specific processor priority information, wherein the operation-specific processor priority information is stored in advance of running the operations; and a scheduler configured to perform scheduling, by allocating operations to be run in the data regions between the processors available for the data processing.

2. The apparatus of claim 1, wherein the operation-specific processor priority information comprises priority levels of the processors available for the data processing, to run each operation at high speed.

3. The apparatus of claim 1, wherein the scheduler is further configured to manage the operations to be run in the data regions by placing the operations to be run in the data regions in a queue.

4. The apparatus of claim 3, wherein the scheduler is further configured to place first in the queue, operations to be run in data regions having an operation dependency therebetween, regardless of a sequence between the data regions.

5. The apparatus of claim 4, wherein the scheduler is further configured to place first in the queue operations to be run in data regions having an operation dependency therebetween that is higher than other data regions.

6. The apparatus of claim 1, wherein the partitioner is further configured to preliminarily partition the data into preliminary data regions and incorporate preliminary data regions, whose size is less than a predetermined size, with their neighboring preliminary data regions.

7. The apparatus of claim 6, wherein the partitioner is further configured to determine a direction in which to partition the data, in response to the data being two-dimensional or higher-dimensional.

8. The apparatus of claim 6, wherein the partitioner is further configured to additionally partition each data region, whose size is greater than a predetermined size, into smaller data regions.

9. The apparatus of claim 1, wherein the data regions comprise at least one data region with data for more than one operation.

10. An apparatus for optimizing data processing in a heterogeneous multi-processor environment, the apparatus comprising:
an optimizing processor comprising:
an analyzer configured to analyze operations to be run in connection with data processing, to analyze a processor type of each processor available for the data processing among processors in the heterogeneous multi-processor environment, and to analyze a quantity of the processors available for the data processing;
a partitioner configured to
dynamically partition data into data regions having different sizes, based on the analyzed operations and operation-specific processor priority information, wherein the operation-specific processor priority information is stored in advance of running the operations, and
determine a direction in which to partition the data, in response to the data is two-dimensional or higher-dimensional, wherein the direction in which to partition the data is a direction that produces a smallest quotient when dividing a total quantity of operations to be run by a quantity of data regions; and a scheduler configured to perform scheduling, by allocating operations to be run in the data regions between the processors available for the data processing.

11. A method of optimizing data processing in a heterogeneous multi-processor environment, the method comprising:
analyzing, in an optimizing processor,
operations to be run in connection with data processing, by putting on hold operations called over a predetermined period of time, and monitoring the called operations for the predetermined period of time,
a processor type of each processor available for the data processing among processors in the heterogeneous multi-processor environment, and
a quantity of the processors available for the data processing;
dynamically partitioning data into data regions having different sizes, based on the analyzed operations and operation-specific processor priority information, wherein the operation-specific processor priority information is stored in advance of running the operations; and
performing scheduling, by allocating operations to be run in the data regions between the processors available for the data processing.

12. The method of claim 11, wherein the operation-specific processor priority information comprises priority levels of the processors available for the data processing, to run each operation at high speed.

13. The method of claim 11, wherein the performing scheduling comprises managing the operations to be run in the data regions by placing the operations to be run in the data regions in a queue.

14. The method of claim 13, wherein the performing scheduling further comprises placing first in the queue operations to be run in data regions having an operation dependency therebetween, regardless of a sequence between the data regions.

15. The method of claim 14, wherein the performing scheduling further comprises placing first in the queue operations to be run in data regions having an operation dependency therebetween that is higher than other data regions.

16. The method of claim 11, wherein the dynamically partitioning the data comprises preliminarily partitioning the data into preliminary data regions and incorporating preliminary data regions, whose size is less than a predetermined size, with their neighboring preliminary data regions.

17. The method of claim 16, wherein the dynamically partitioning the data further comprises determining a direction in which to partition the data, in response to the data being two-dimensional or higher-dimensional.

18. The method of claim 16, wherein the dynamically partitioning the data further comprises additionally partitioning each data region, whose size is greater than a predetermined size, into smaller data regions.

19. A method of optimizing data processing in a heterogeneous multi-processor environment, the method comprising:
analyzing, in an optimizing processor,
operations to be run in connection with data processing,
a processor type of each processor available for the data processing among processors in the heterogeneous multi-processor environment, and
a quantity of the processors available for the data processing;

dynamically partitioning data into data regions having different sizes, based on the analyzed operations and operation-specific processor priority information, wherein the operation-specific processor priority information is stored in advance of running the operations,
wherein the dynamically partitioning the data comprises determining a direction in which to partition the data, in response to the data being two-dimensional or higher-dimensional, and
wherein the direction in which to partition the data is a direction that produces a smallest quotient when dividing a total quantity of operations to be run by a quantity of data regions; and
performing scheduling, by allocating operations to be run in the data regions between the processors available for the data processing.

* * * * *